Oct. 11, 1966 P. KRAFT ET AL 3,278,279
UNIFORMLY POROUS PRODUCT CONSISTING BASICALLY
OF METAL FIBERS AND PROCESS OF MAKING IT
Filed Oct. 23, 1963
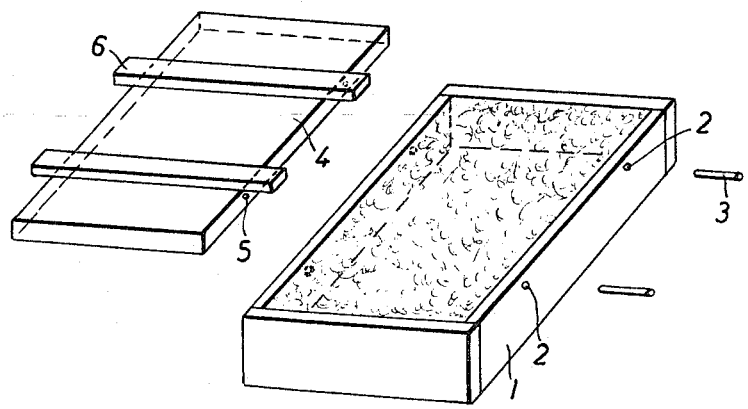
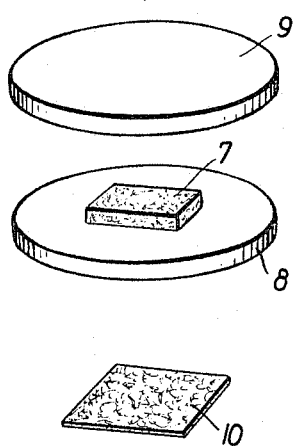
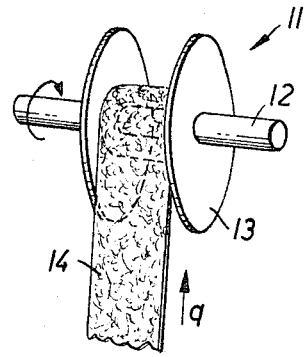

3,278,279
UNIFORMLY POROUS PRODUCT CONSISTING BASICALLY OF METAL FIBERS AND PROCESS OF MAKING IT

Paul Kraft, Geislingen an der Steige, and Josef Schlömer, Reinbek Bezirk, Hamburg, Germany, assignors, by mesne assignments, to Wuerttembergische Metallwarenfabrik, Geislingen an der Steige, Germany
Filed Oct. 23, 1963, Ser. No. 318,431
Claims priority, application Germany, Oct. 25, 1962, J 22,547
18 Claims. (Cl. 29—182)

The present invention relates to a new and improved porous product and to the method of manufacturing said new and uniformly porous material from metal fibers of any given length, thickness and any desired orientation, the material remains characterised by a low specific weight, variable porosity and good dimensional stability. Metal fiber material manufactured by the method of the invention can be used as a base material (foundation) for subsequent impregnation with plastics materials, ceramics and mineral and metallic substances. Furthermore, it is possible to produce a gaseous or liquid diffusion treatment of the metal fibers, because of the high porosity which can be produced within the resultant shaped article.

In the usual processes of making products from metal fibers by sintering the randomly distributed fibers in a a mold under pressure, it is difficult to introduce the fibers into the press mold in a uniformly distributed way. The smallest inequalities in the distribution have the effect of producing differences in density in the shaped article, so that the usual methods are unsuitable for producing a uniformly porous molded body with a variable and reproducible porosity.

It is an object of the present invention to avoid these disadvantages and to produce a uniformly porous molded member made from metal fibers.

Another object of the invention is to provide a porous product consisting basically of metal which comprises an agglomerate of small elongated metal particles interconnected by sintering, said agglomerate being permanent in shape and the porosity of which being substantially uniformly spaced and being of any desired degree in the order of between 0% to 99%, said metal particles being selected from the group consisting of metal fibers, metal turnings, metal hairs, and metal strands, said metal particles being orientated in any desired design and being sintered, the total volume of said agglomerate being fixed. The resulting porous product may be compressed at a pressure rate in the order of up to about 5 tons/cm.$^2$.

A further object of the invention is to provide a porous product consisting basically of metal which comprises an agglomerate of small elongated metal particles interconnected by sintering, said agglomerate being permanently in shape and the porosity of which being substantially uniformly spaced and being of any desired degree in the order of between 0% and 95%, said metal particles are being covered with a layer of some substance selected from the group consisting of synthetic resin, ceramic material, metals, metal alloys, metal compounds and minerals, and being arranged in any desired orientated shape and design, and being sintered, the total volume of said agglomerate remaining constant.

Yet another object of the invention is the method of making a uniformly porous product consisting basically of metal, which includes the steps of uniformly arranging in any straight direction small elongated metal particles selected from the group consisting of metal fibers, metal turnings, metal hairs, and metal strands, to form an agglomerate, applying a predetermined internal tension to said agglomerate and subjecting said agglomerate to a sintering operation at a constant volume with said tension disappearing and the product becoming permanent in shape. After sintering the product may be subsequently compacted by compressing it at a pressure in the order of up to about 5 tons/cm.$^2$.

Yet another object of the invention is to provide a method of making a uniformly porous product consisting basically of metal, which includes the steps of winding small elongated metal particles under tension on a winding device, in the form of long virtually endless fiber strands, to form a round body, removing said body from the winding device and subjecting it to a sintering operation at constant volume. In order to simplify the sintering step, there may be applied suitable metallic additives such as copper and bronze onto the metal fibers, before the sintering operation is started. Furthermore, the sintered product may be treated with some substances such as synthetic resins, ceramic material, metals, metal alloys, metal compounds and minerals, in order to have the surface areas of the metal particles coated with a surface layer, and the thus treated product may be subjected to an appropriate heat treatment procedure in order to cure said coating.

Further objects and advantages of the present invention will be apparent from the following description.

The invention consists essentially in using as the metal particles particularly steel wool particles, and the elongated particles entering into the constitution of this porous metallic product are constituted for example by bits of metallic wire, or small shreds cut off from a sheet of metal, from metal wires or strips, or metallic turnings or elongated filings, or filaments or strands, and are used in the form of fibers ranging in size one thousandth to several tenths of millimeter in width, one thousandth to several millimeters in breadth and up to several meters in length.

The fiber material should be introduced into a mold with a suitable volume in layers as uniform as possible, so that the space available becomes filled uniformly throughout and the metal fiber mass is accommodated uniformly within the volume of the mold. The volume of the mold is so chosen that the fiber material is under a predetermined internal tension, which disappears under the influence of the sintering temperature. With relatively large volumes and for the production of predetermined properties, for example layers with different orientations of the fibers, partial strengthening or different porosities within the molded body, it is preferable for the fiber material to be introduced into the mold in several separate parts.

Basically, any round or angular mold can be used, into which fiber strands are stacked in any direction and, if necessary, at different angles to one another. For example, the fiber strands cut to suitable length can be laid radially inside round molds, they can also be arranged as an endless strand extending circumferentially of the mold, or both arrangements can be used simultaneously in layers. These arrangements are particularly preferable for the manufacture of round or annular bodies.

The method of manufacture according to the present invention allows the use of metal fibers of different fiber thickness and/or width inside one body.

According to a preferred embodiment of the method of the invention, the fiber agglomerate can also be produced by winding the metal fibers under tension on a winding device, in the form of long, virtually endless fiber strands, to form a round body. The upper limit of the initial stress is the tensile strength of the fiber strands. The tightness of the fiber agglomerate can be increased during the winding step by using a pressure roller. Because of the mutual attraction of the individual fibers, e.g. of the steel fiber strands, a shaped body is produced before sintering. The thus pre-formed body, which remains of stable shape due to interlocking of the individual fibers during the winding step, is then removed from the winding device. The fiber body now possesses such dimensional stability that the sintering process to follow can be effected with or without a mold.

With the molded bodies manufactured according to the method of the present invention, the porosity of the material, which can be up to 99% and is distributed uniformly over the entire body, can be decreased to any amount upon subsequent compaction and if necessary reduced so much that an elastic and flexible material is produced with, if necessary, a porosity decreased virtually to zero.

In order to manufacture a molded body according to the present invention, metal fibers are wound or cut, then weighed and uniformly distributed in a sinter mold and sintered at a predetermined volume. If the sintering is carried out without maintaining constant the volume of the metal fibers, then as a consequence of its own weight, the material would be formed with a density gradient from the base of the mold up to the uppermost layer of the fibers. However if a cover is placed on the mold, when it is filled with metal fibers, and the cover is fixed in a predetermined position, then the entire volume of the fibers in the mold is subjected to a uniform initial tension, which is built up as a consequence of the mutual attraction of the fibers. This mutual attraction is exhibited even by fiber strands having parallel fibers, since they have rough edges caused by vigorously tearing or cutting flat fibers from strip or wire, so that the fibers can hook into each other and so become fixed together. With smooth parallel metal wires inserted thus into a mold, no initial tension is produced.

Since there is not the problem of an outer pressure acting during sintering, the fibers come in contact with those therebeneath only at comparatively few positions, so that only relatively few welded points are formed within the material during sintering. As a consequence, the individual hollow spaces within the sintered molded body are large in comparison with those found in material of corresponding porosity sintered under pressure.

According to the method of the present invention, therefore not only the porosity as such, but also the cross-sectional size of the internal hollow spaces vary and are reproducible and adjustable, since the fiber masses to be introduced into a predetermined volume are mutually balanced as regards the desired properties such as fiber strength, fiber width, and if necessary also fiber orientation and total weight. Consequently, with equal volume and equal fiber thickness or fiber widths of the individual fibers used, the porosity of the body becomes lower as the total weight of the entire fiber agglomerate is greater, whereas if, on the other hand, with equal volume and equal total weight, the porosity becomes higher, the thicker or wider the individual fibers will be. Furthermore, with equal total weight and equal volume, the number of welding points is lower, the thicker or wider the individual fibers will be. This is important where there is subsequent treatment, namely compression, of the sintered molded body. The fewer welding points in the material to be compressed, so much the greater is the flexibility or elasticity of the material produced after compressing the fiber body.

With greater stacks of fibers, the weight of the charge can be supported by suitable profiling of the inner walls of the mold with grooves, projections and the like, according to the method of the present invention, whereby the number of welding points in the material can be accurately reproduced and the form and degree of porosity can be regulated as desired. The projections and grooves prevent undesired compression and subsidence of the fibers, upon reaching the sintering temperature, as a consequence of their own weight. With fiber cores having a large distance between the side walls, it is preferable for the mold to be provided with thin intermediate members between the side walls, the members having grooves or ribs and being made of ceramic material or graphite.

A further possible way of handling greater stack heights, namely greater dead weights of the fibers, is to orient the metal fibers inserted in the mold so that all the fibers lie perpendicular to the base surface of the mold. In these circumstances, the rigidity of the metal fibers in their longitudinal direction is especially great. This method is recommended, when, for example, long cylindrical fiber bodies with small flow resistance for gas or liquid have to be made from steel fibers.

The sinter molds to be used consist preferably of graphite or ceramic material and have a removable cover, which can be immovably fastened during the sintering step. The cover can be formed with a plane inner surface, but it can also have a non-plane inner surface, whereby the fiber masses for each volume part can be arranged differently in the molded body to be manufactured in the desired way. This method allows the easy manufacture of molded members with different wall thicknesses.

The sintering temperature to be used depends upon the kind of metal forming the fibers. It should not exceed the fusion temperature of the metal in question or the solidus line of the alloy in question, since otherwise the metal becomes too soft or the fibers begin to melt and thus the entire volume of the mold will no longer be filled. The balance between fiber rigidity and fiber deadweight would thereby be destroyed, since then free space would be available, so that a constant volume, as required by the present invention, could not be preserved.

In order to simplify the sintering step or to decrease the sintering temperature, a suitable metallic additive can be introduced into the metal fiber agglomerate, for example, copper, bronze, etc. in the form of a coating or a powder.

Furthermore, coatings can be provided in known manner on the fiber body or the body can be treated by filling the pores with impregnants. According to the material chosen as a coating for the fiber body or for filling the pores and depending upon requirements, it may be necessary to subject the metal fiber body so treated to an even longer heat treatment. The kind of heat treatment is known and modifies the properties of the different substances. With synthetic materials, the temperature generally lies between 100° C. and 250° C.; with ceramic substances, the temperature can range up to 1800° C.

In many cases, it is preferable, after covering the fibers with a layer of some substance or filling the pore spaces, to subject the fiber body manufactured according to the invention to any desired additional pressure treatment for increasing the thickness and for producing special shapes. In these cases, the pressures reached are preferably up to 5 tons/cm.$^2$. This pressure treatment may also be effected by a rolling step.

The invention will now be described with reference to the following examples given in conjunction with the accompanying drawings, in which the invention is illustrated but not in a limiting manner. In the drawings:

FIG. 1 shows a mold in which a rectangular fibrous body of constant volume can be sintered;

FIG. 2 shows diagrammatically the process of subsequent compacting of a sintered fibrous articles;

FIG. 3 shows a winding device for the manufacture of a fibrous article of annular shape in accordance with the invention.

In FIG. 1, reference 1 illustrated a hollow mold for receiving steel fibers. In its upper one-third, this has openings 2 in its side walls for receiving holding pins 3. A cover 4 is provided for the hollow mold 1, which has apertures 5 arranged in accordance with the openings 2, in which apertures 5 the holding pins 3 are mounted. The cover 4 also has securing ribs 6 which are effective in place of the securing pins 3, if the mold is closed by the cover and weights have been placed on the latter.

*Example 1*

In a sinter mold 1 consisting of graphite with internal dimensions 170 x 110 x 40 mm., which had been painted on its internal sides with a parting agent consisting of very fine aluminum oxide powder, 40 grams of steel fibers, having an average diameter of 0.03 x 0.01 mm. with an average fiber length of 110 mm., were stacked so that the whole of the fibers lay more or less parallel to one another.

The composition of the steel fibers was as follows:

0.15% C
0.1–1.3% Mn
0.15% Cr
Remainder—Fe.

On stacking the steel fibers, a careful distribution within the space of the mold must be observed, since otherwise inaccuracies occur. Thereafter, a cover consisting of graphite is placed on the steel fiber mass stacked in the mold and this is pressed down into the mold so that a mold volume of 170 x 110 x 10 mm. is obtained, a pressure of about 5 kg. being required for application of the cover.

As can be seen from FIG. 1 of the drawing, the cover is then held by means of the laterally-inserted pins 3. The steel fibers then remained compressed to the predetermined volume.

The closed mold is located in an electric furnace and sintered under a protective gas at a temperature of 1100° C. "Exogas," which is obtained by partial combustion of ordinary heating gas, is used as the protective gas. On cooling to room temperature, a steel fiber article is removed from the sinter mold, having dimensions of 170 x 110 x 10 mm. The article has a density of about 0.2 g./cm.$^3$. This corresponds to a pore volume of about 97%.

*Example 2*

Operation proceeded as in Example 1, but the cover 4 was not fixed with pins, but was located on the steel fibers charged into the mold 1 and weighted with weights of about 5 kg. The cover could only sink so far into the mold until it was held or arrested by the securing ribs 6, as can be seen in FIG. 1. The article was sintered as described in Example 1 and the sintered fibrous article when removed from the mold likewise had a density of about 0.2 g./cm.$^3$ and a pore volume of about 97%.

*Example 3*

A fibrous article manufactured as described in Examples 1 and 2 was subsequently compacted between two flat plates under a pressure of 0.5 t./cm.$^2$, as shown in FIG. 2. The sintered fibrous article is indicated at 7. It was supported on a plate 8 and a pressure plate 9 was then pressed against it in the direction of the arrows with a pressure $p$.

After the compaction, an article 10 was obtained which was constituted by a flexible porous shaped article measuring 170 x 110 x 2 mm. The pore volume of 97% was reduced to about 5% by the compaction. The density of the steel fiber article so produced amounted to 7.4 g./cm.$^3$. This article could be used directly with advantage for the covering of plate dampers.

*Example 4*

If a shaped article of steel wool with circular dimensions is to be manufactured, instead of a flat rectangular one, this can be done with advantage by a method which can be best described in relation to FIG. 3. A winding device 11 is indicated diagrammatically. This consists essentially of a roller 12 with lateral limiting disks 13. The whole device is held in a lathe (not shown) and a so-called fiber strand 14, of the kind which is obtained in the manufacture of steel fibers on the usual machinery, is wound on the roller 12 in the direction of the arrow $q$.

The fiber strip was wound with a tension of about 20 kg. On completion of the winding step, the fibers were so strongly held together that the wound shaped article did not spring apart on release of the winding tension. One of the lateral limiting rollers 13 was removed and the annular wound steel fiber body was then removed from the device. A shaped article was thus obtained which had a pore volume of about 80%, an outer diameter of 150 mm., an inner diameter of 75 mm. and a height of 50 mm.

The shaped article was then exposed in a glow chamber filled with nitrogen as protective gas and sintered in a gas-heated sintering furnace at 1100° C. The article so formed had the same dimensions as before and a pore volume of about 80%.

*Example 5*

Loose steel fibers were agglomerated as described in Example 1 in a suspension consisting of acetone as the liquid phase and a so-called copper/tin slip as the solid phase. This copper/tin slip consisted of the finest copper and tin powder and had a composition of about 90% copper, 10% tin. Each fiber was surrounded on immersion with a thin film of this suspension. After drying off the solvent, the metal fraction of the suspension remained on the fiber surfaces. The fibers so treated were sintered at 1100° C. in a protective gas atmosphere (Exogas) and a bronze metal was so formed from the copper/tin components which formed a liquid phase at the sintering temperature of 1100° C. This effected a welding or soldering of the contacting points of the fibers. The shaped article so formed was essentially more strong and pressure-resistant than otherwise obtained and subsequent compaction required a pressure of 1 to 2 tons/cm.$^2$, instead of 0.5 ton/cm.$^2$, as in the previous example, in order to obtain a lower pore volume of about 5%.

*Example 6*

A shaped article was manufactured according to Example 1 and the fibers were then provided with a protective overcoat. Such an overcoat was applied by immersing the uncompacted shaped article in a plastics material solution. On draining off the excess plastics material, the solvent was immediately evaporated off and the synthetic material was hardened at 250° C. The steel article so formed had a thin plastics material coating of about 5 to 20$\mu$ on all the steel fibers. Such a shaped article with a high porosity of 95% could readily be used as a dust filter.

*Example 7*

Immersion of a fiber article as described in Example 1 was so carried out that the viscosity or solid proportion of the immerision agent was essentially higher than that used in Example 6, so that after immersion and evaporation of the remainder, a greater proportion of solids was left adhering. A steel wool article manufactured according to Example 1 was thus provided with a commercial aqueous "Teflon" (polytetrafluorethylene) coating. After evaporation of the solvent, a second immersion process was carried out. By the immersion, about 20% by weight of "Teflon" calculated on the initial weight of the steel fibers was applied to the porous article. After completing the immersion, compaction was carried out at about 2 tons/cm.² A shaped article measuring 170 x 110 x 3 mm. was obtained. The pore volume was less than 2%. A hardening process was carried out on the applied "Teflon" in its subsequent form or the hardening process was carried out by way of melting of the separate fiber coatings so that the shaped article assumed a very high strength. Small portions could be readily removed from this article by sawing and could be used as sealing ribs or similar articles which were particularly suitable when used under sliding friction conditions. The coefficient of friction was les than $\mu=0.1$.

Of the products manufactured according to the present invention, parts an be manufactured for the following purposes:

Metal fiber bodies for filters, machine parts, for sound dampening and heat insulation;

Porous fiber-skeleton-bodies, whose surface is provided with a covering of ceramic material, metal, metal alloys, metal compounds and/or mixtures of these substances or minerals;

Porous bodies made from metal fibers, in which the pore space is filled with synthetic material, ceramic material, metals, metal alloys, metal compounds and/or mixtures of these substances or minerals;

Porous bodies made from metal fibers, in which the fibers are subsequently improved with the temperature, corrosion and/or oxidation resistance of the base metal of improved metals, such as, for steel fibers, metals of Groups III–VI of the Periodic System, in particular, chromium and aluminium, for the purposes specified under the aforementioned points.

We claim:

1. A porous product consisting of a metallic base material comprising an agglomerate of small elongated unwoven uniformly distributed metal particles oriented to a uniform porosity distribution in predetermined relative directions and interconnected by sintering, said agglomerate having a permanently set shape and a substantially uniform porosity variable selectively up to 98%.

2. The product according to claim 1 wherein said metal particles are stacked parallel to each other.

3. The product according to claim 1 wherein said metal particles are arranged radially.

4. The product according to claim 1 wherein said metal particles are arranged circularly.

5. The product according to claim 1 wherein said metal particles are in the form of metal fibers ranging in size from one thousandth to several tenths of a millimeter in thickness, one thousandth to several millimeters in width and up to several meters in length.

6. The product according to claim 1 wherein said metal particles are covered with a layer of coating material selected form a group consisting of synthetic resins minerals and metals.

7. The method of manufacturing a uniformly porous product consisting of a metallic base material including the steps of uniformly placing small elongated metal particles into a form in a direction to extend parallel to each other to make an agglomerate of said particles, compressing said agglomerate in said form under a pressure between about 0.02 to 0.04 kg./cm.² to apply a predetermined internal tension to said agglomerate, and subjecting said agglomerate to a sintering operation without applying additional pressure during sintering and without decreasing the volume of the sintered product.

8. The method according to claim 7 including subsequently compacting said product by compressing it as a maximum pressure of 3 tons/cm.²

9. The method of manufacturing a uniformly porous product consisting of a metallic base material including the steps of stacking said elongated metal particles into a form at different angles to one another to make an agglomerate of said particles, compressing said agglomerate in said form under a pressure between about 0.02 to 0.04 km./cm.² to apply a predetermined internal tension to said agglomerate, and subjecting said agglomerate to a sintering operation without applying additional pressure during sintering and without decreasing the volume of the sintered product.

10. The method according to claim 9 including subsequently compacting said product by compressing it at a maximum pressure of 3 tons/cm.²

11. The method of manufacturing a uniformly porous product consisting of a metal base material including the steps of uniformly placing said elongated metal particles into a form in a circular arrangement to make an agglomerate of said particles, compressing said agglomerate in said form under a pressure between about 0.02 to 0.04 kg./cm.² to apply a predetermined internal tension to said agglomerate, and subjecting said agglomerate to a sintering operation without applying additional pressure during sintering and without decreasing the volume of the sintered product.

12. The method according to claim 11 including subsequently compacting said product by compressing it at a maximum pressure of 3 tons/cm.²

13. The method of manufacturing a uniformly porous product consisting of a metallic base material including the steps of winding coherent elongated metal particles in the form of long continuous strands under tension on a winding device to form a coherent cylindrical body, removing said coherent body from said winding device and subjecting said body to a sintering operation without applying additional pressure during sintering and without decreasing the volume of the sintered product.

14. The method according to claim 13 including subsequently compacting said product by compressing it at a maximum pressure of 3 tons/cm.²

15. The method of manufacturing a uniformly porous product consisting basically of steel wool including the steps of successively placing elongated steel wool pieces in the same direction into a form to make an agglomerate, compressing said agglomerate at a pressure between 0.02 to 0.04 kg./cm.² to apply a predetermined internal tension to said agglomerate, subjecting said agglomerate in said form to a sintering operation at a temperature between about 1000° C. to 1150° C. without applying additional pressure, applying a layer of coating material selected from a group consisting of synthetic resins, minerals and metals, to the surfaces of the steel wool material and subjecting said agglomerate to a heat treatment for curing said coating and without decreasing the volume of the sintered product.

16. The method according to claim 15 including subsequently compacting said product by compressing it at a maximum pressure of 5 tons/cm.²

17. The method of manufacturing a uniformly porous product consisting basically of steel wool including the steps of uniformly placing elongated steel wool fibers in the form of strands in the same direction into a mold covering said strands with metallic additives selected from the group consisting of copper and copper alloys and subjecting said strands to a sintering operation in said mold without additional pressure during sintering to obtain a permanent set of said agglomerate and without decreasing the volume of the sintered product.

18. The method according to claim 17 including subsequently compacting said product by compressing it at a maximum pressure of 5 tons/cm.²

(References on following page)

References Cited by the Examiner

UNITED STATES PATENTS

| | | | |
|---|---|---|---|
| 2,577,187 | 12/1951 | Fox | 29—419 X |
| 2,627,531 | 2/1953 | Vogt. | |
| 3,029,493 | 4/1962 | Rzeszutko et al. | 29—419 X |
| 3,087,233 | 4/1963 | Turnbull | 29—182 |
| 3,127,668 | 4/1964 | Troy | 29—182 |
| 3,165,826 | 1/1965 | Bentov | 29—419 |
| 3,178,280 | 4/1965 | McGee et al. | 75—200 |

OTHER REFERENCES

Metcalfe, A. G. et al.: Fiber Metallurgy. In Metal Progress, March 1955, pages 81–84.

Powder Metallurgy, Schwarzkopf, New York, Macmillan Co., 1947, pages 61, 62, and 79–81.

Product Engineering, May 30, 1960, pages 57–61.

L. DEWAYNE RUTLEDGE, *Primary Examiner.*

REUBEN EPSTEIN, BENJAMIN R. PADGETT,
*Examiners.*

R. L. GRUDZIECKI, *Assistant Examiner.*